US010459964B2

(12) United States Patent
Mei et al.

(10) Patent No.: US 10,459,964 B2
(45) Date of Patent: Oct. 29, 2019

(54) PERSONALIZED TRENDING IMAGE SEARCH SUGGESTION

(71) Applicant: Microsoft Technology Licensing, LLC, Redmond, WA (US)

(72) Inventors: Tao Mei, Beijing (CN); Yan-Feng Sun, Redmond, WA (US); Yong Rui, Sammamish, WA (US); Chun-Che Wu, New Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 15/323,247

(22) PCT Filed: Jul. 4, 2014

(86) PCT No.: PCT/CN2014/081634
§ 371 (c)(1),
(2) Date: Dec. 30, 2016

(87) PCT Pub. No.: WO2016/000251
PCT Pub. Date: Jan. 7, 2016

(65) Prior Publication Data
US 2017/0139954 A1 May 18, 2017

(51) Int. Cl.
*G06F 16/50* (2019.01)
*G06F 16/9038* (2019.01)
(Continued)

(52) U.S. Cl.
CPC ............ *G06F 16/50* (2019.01); *G06F 16/532* (2019.01); *G06F 16/58* (2019.01);
(Continued)

(58) Field of Classification Search
CPC ......... G06F 17/30277; G06F 17/30991; G06F 17/3064; G06F 17/30244; G06F 17/3097;
(Continued)

(56) References Cited

U.S. PATENT DOCUMENTS 8,504,547 B1 * 8/2013 Yee .................. G06F 17/30268
707/706
2008/0172374 A1 * 7/2008 Wolosin .............. G06F 17/3087
707/999.005
(Continued)

FOREIGN PATENT DOCUMENTS

CN 101216837 A 7/2008
CN 102339301 A 2/2012
(Continued)

OTHER PUBLICATIONS

"Supplementary Search Report Issued in European Patent Application No. 14896375.4", dated Jun. 20, 2017, 4 Pages.
(Continued)

*Primary Examiner* — Yuk Ting Choi
(74) *Attorney, Agent, or Firm* — Schwegman Lundberg & Woessner, P.A.

(57) ABSTRACT

Techniques and constructs to facilitate suggestion of image-based search queries can provide personalized trending image search queries. The constructs may enable identification of trending image searches and further personalize those trending image search queries for an identified user based on information about on the user's search history and the search histories of other users. The constructs also may select a representative image for display to the user, such that selection of the representative image will execute the search query. The representative image may be selected from a plurality of candidate images based on its burstiness.

20 Claims, 4 Drawing Sheets

(51) Int. Cl.
*G06F 16/9535* (2019.01)
*G06F 16/9032* (2019.01)
*G06F 16/532* (2019.01)
*G06F 16/58* (2019.01)

(52) U.S. Cl.
CPC .... *G06F 16/9038* (2019.01); *G06F 16/90324* (2019.01); *G06F 16/9535* (2019.01)

(58) Field of Classification Search
CPC ............... G06F 17/30; G06F 17/3053; G06F 17/30864; G06F 17/30268; G06F 17/30861; G06F 17/30899; G06F 17/30395; G06F 3/04842; G06F 16/50; G06F 16/9038; G06F 16/9535; G06F 16/90324; G06F 16/532; G06F 16/58
See application file for complete search history.

(56) References Cited

U.S. PATENT DOCUMENTS

| | | |
|---|---|---|
| 2009/0171929 A1 | 7/2009 | Jing et al. |
| 2010/0205202 A1 | 8/2010 | Yang et al. |
| 2011/0158558 A1* | 6/2011 | Zhao ................. G06F 17/30256 382/305 |
| 2011/0161260 A1* | 6/2011 | Burges .............. G06F 17/30887 706/12 |
| 2012/0109943 A1 | 5/2012 | Yang et al. |
| 2012/0136855 A1* | 5/2012 | Ni ....................... G06F 16/9535 707/724 |
| 2012/0158685 A1* | 6/2012 | White ................. G06F 16/9535 707/706 |
| 2012/0296897 A1 | 11/2012 | Xin-jing et al. |
| 2014/0033085 A1* | 1/2014 | Kopetsky .............. G06F 3/0481 715/763 |
| 2015/0161175 A1* | 6/2015 | Yee .................... G06F 17/30277 707/772 |
| 2015/0169643 A1* | 6/2015 | Kogan .............. G06F 17/30277 707/748 |

FOREIGN PATENT DOCUMENTS

| | | |
|---|---|---|
| CN | 103324750 | 9/2013 |
| CN | 103514254 | 1/2014 |
| WO | WO2011143065 | 11/2011 |

OTHER PUBLICATIONS

"Office Action Issued in European Patent Application No. 14896375.4", dated Jul. 10, 2017, 11 Pages.

"First Office Action and Search Report Issued in Chinese Patent Application No. 201480048280.1", dated May 28, 2018, 17 Pages.

Wu, et al., "Learning to Personalize Trending Image Search Suggestion", In Proceedings of the 37th International ACM SIGIR Conference on Research & Development in Information Retrieval, Jul. 3, 2014, pp. 727-736.

PCT Search Report and Written Opinion dated Apr. 3, 2015 for PCT Application No. PCT/CN2014/081634, 12 Pages.

"Second Office Action Issued in Chinese Patent Application No. 201480048280.1", dated Jan. 4, 2019, (w/ English Translation), 27 Pages.

* cited by examiner

PERSONALIZED TRENDING IMAGE SEARCH SUGGESTION

CROSS REFERENCE TO RELATED APPLICATIONS

This application is a 35 U.S.C. 371 National Stage Application of International Application No. PCT/CN2014/081634, filed Jul. 4, 2014, the entire contents of which is incorporated herein by reference.

BACKGROUND

Image searching is now supported by most search engines. Conventionally, a user enters a text-based search into a browser and the search engine returns images related to the search terms. Moreover, some search engines provide suggested search terms for a user, either for text-based searching or image-based searching. For example, some conventional web browsers display a listing or array of selectable images and/or textual descriptions. In some existing solutions, a user may click on these images/textual descriptions to launch a search or otherwise obtain more information about the clicked-on representation. Traditionally, these same representations were provided to all users of a browser or site, generally because their relevance or popularity. These conventional systems provide no personalization for users.

SUMMARY

This disclosure describes systems and methods for providing personalized image-based search suggestions. In at least one example, an algorithm determines personalized image searches from trending image searches, to provide personalized trending image search suggestions for a specific user. The techniques described herein also may generate one or more representative images, from a plurality of candidate images, to represent each of the personalized trending image search(es). The representative images may be chosen from the candidate images based on an increase in a number of views of the respective image, among other information.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Examples described herein provide techniques and constructs to alter a user experience by suggesting personalized, trending image search queries using resources including, for example, processing units and accelerators. Such resources may be implemented using specialized programming and/or hardware programmed with specific instructions to implement the specified functions. For example, resources may have different execution models as is the case for graphics processing units (GPUs) and computer processing unit (CPUs).

Users typically explore the web by entering a short query, such as one or more search terms, into a search box associated with a search engine. Conventional searches of this type have been used to return text-based results, e.g., a list of textual links, and to return images. More recently, some web interfaces have begun suggesting searches by providing selectable images indicative of some current topic or newsworthy event. In such systems, every user logging on to a web interface associated with a search engine will be presented the same one or more selectable images. A slight variation will consider a geographical location of the user(s) and tailor the selectable images to include images that may be of local interest. In these existing systems, selecting one of those images may launch a search with the search engine or may direct a user to a site associated with the image. Of course, each user has unique preferences and search-objectives when accessing the search engine or otherwise interfacing with the web. The system described herein can provide a user accessing a search engine or web interface with a number of personalized images, each representing a personalized (for the user) search suggestion. The techniques described herein may also identify trending image searches, i.e., searches that are increasing in popularity or frequency, to provide the user with an up-to-date experience. The techniques may then apply personalization algorithms to those trending image searches.

In various examples, the algorithm for suggesting personalized trending image searches as described herein can identify image search queries as trending by reviewing an image search log. In these examples, users allow access to information about their search histories. Throughout this disclosure, users have the option of allowing their image search queries to be used. The techniques described herein may readily identify searches from the trending search queries for a high-volume user, e.g., a user with an extensive search history, because there may be a wealth of information about that user. In other implementations, it is more likely that the user search history is relative sparse, and thus there is limited knowledge about the user's preferences. In some examples, users who have no search history or who opt-out of allowing access to their search history may not benefit from techniques described herein. Instead, their experience may be one of the conventional experiences described above. In other examples, the techniques described herein may be applied for users who have no search history or who opt-out of allowing access to their search history based on the image search queries of other users who made the same or similar query. In various examples, the algorithm for suggesting image searches looks to the search histories of other users with similar searches to determine a personalization of the trending image search queries. In at least one example, the techniques consider click-through information of the image search queries of other users and applies matrix factorization techniques to determine personalized trending searches among all trending searches.

The techniques described herein may choose the representative image displayed to the user for each of the determined personalized trending image searches from a number of candidate images responsive to the personalized trending image search. In some examples, the techniques score or rank candidate images based on a number of attributes, with the image having the highest scoring or ranking being used as the representative image, i.e., for presentation to the user. For example, an algorithm for selecting the representative image for presentation to the user may score or rank images based on their relevance, their consistency, attributes of (such as an increase in or a total number of) their click-through, and/or something else. In some implementations, the representative image may best visually represent the reason for which the image search query is understood to be a trending image search query.

Examples of the personalized trending image search suggestion framework are presented in greater detail in the following description and the accompanying figures.

Experiments employing the techniques described herein on a commercial image search engine with a large-scale search log having 21 million users and 41 million queries over a two-week period show that, compared to five baselines, a most popular candidates (MPC) model, a personal frequency (PF) plus MPC model, an item-based collaborative filtering (IBCF) approach, a singular vector decomposition (SVD) model, and a weighted regularized matrix factorization (WRMF) approach, the framework described herein provides up to 50% better query prediction over existing systems. Example experimental results are presented in greater detail in the description of the following figures.

Examples described herein provide techniques and constructs applicable to suggesting personalized trending image search queries and presentation of at least one image representative of each of the suggested personalized image search queries. In various instances, a processing unit configured via programming from modules or APIs to perform techniques as described herein can include one or more of a GPU, a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Various examples, scenarios, and aspects are described further with reference to FIGS. 1-4.

Illustrative Environment

Figure 1:
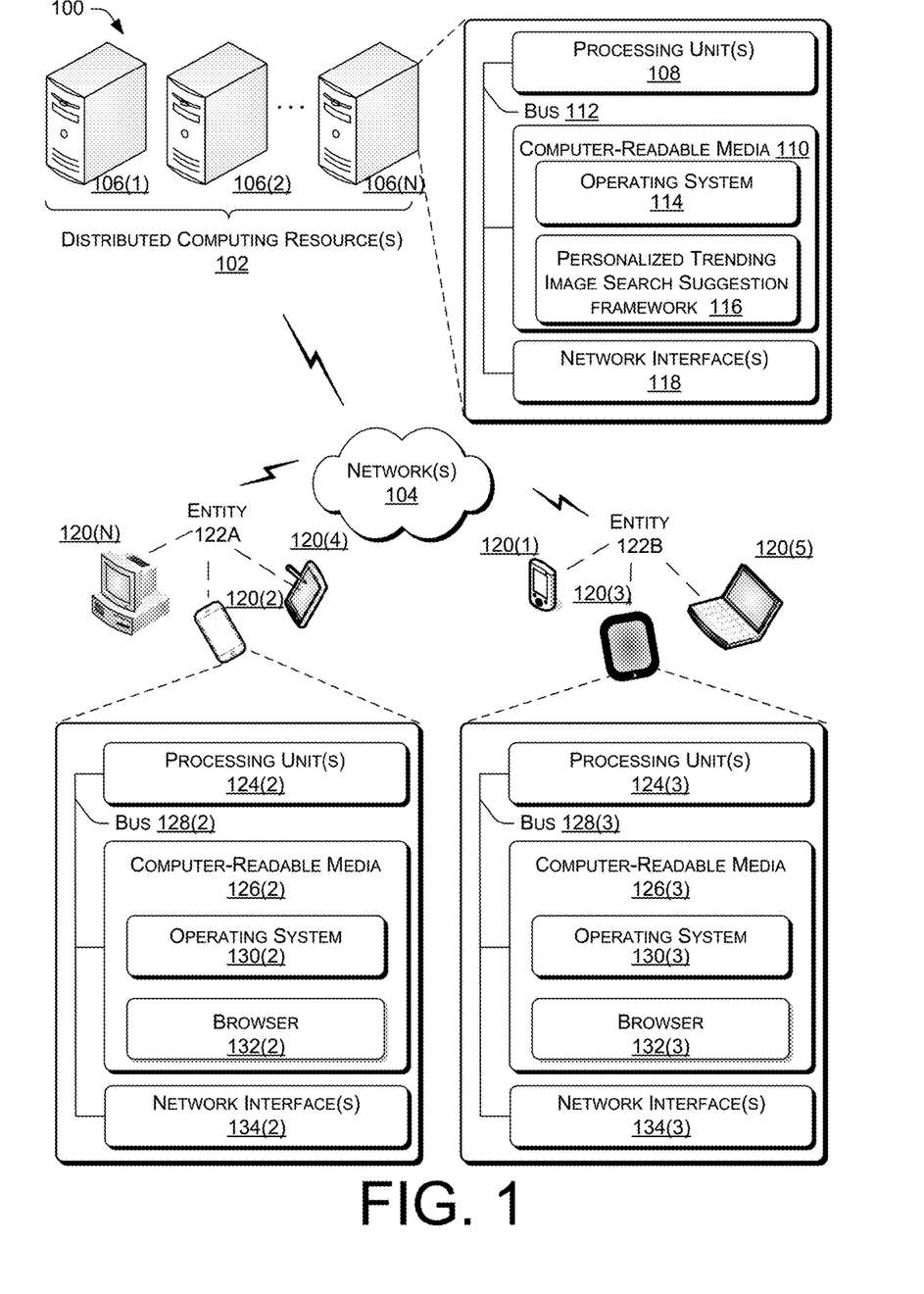
FIG. 1 is a block diagram depicting an example environment for implementing personalized trending image searches as described herein.

FIG. 1 shows an example environment 100 in which examples of personalized trending image search suggestion can operate. In some examples, the various devices and/or components of environment 100 include distributed computing resources 102 that can communicate with one another and with external devices via one or more networks 104.

For example, the network(s) 104 can include public networks such as the Internet, private networks such as an institutional and/or personal intranet, or some combination of private and public networks. The network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 104 can utilize communications protocols, including packet-based and/or datagram-based protocols such as internet protocol (IP), transmission control protocol (TCP), user datagram protocol (UDP), or other types of protocols. Moreover, the network(s) 104 can also include a number of devices that facilitate network communications and/or form a hardware basis for the networks, such as switches, routers, gateways, access points, firewalls, base stations, repeaters, backbone devices, and the like.

In some examples, the network(s) 104 can further include devices that enable connection to a wireless network, such as a wireless access point (WAP). The network(s) may support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, the distributed computing resources 102 include devices 106(1)-106(N). In implementations of this disclosure, the distributed computing resources 102 include a search engine or are operated in conjunction with a search engine. Examples support scenarios where the device(s) 106 can include one or more computing devices that operate in a cluster or other grouped configuration to share resources, balance load, increase performance, provide fail-over support or redundancy, or for other purposes. The device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as desktop computers, the device(s) 106 can include a diverse variety of device types and are not limited to a particular type of device. The device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

The device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on the computer-readable media 110 can include, for example, an operating system 114, a personalized trending image search suggestion framework 116, and/or other modules, programs, or applications that are loadable and executable by the processing unit(s) 108. Alternatively, or in addition, the functionally described herein can be performed, at least in part, by one or more hardware logic components such as accelerators. For example, and without limitation, illustrative types of hardware logic components that can be used include FPGAs, ASICs, ASSPs, SOCs, CPLDs, etc. For example, an accelerator can represent a hybrid device, such as one from ZYLEX or ALTERA that includes a CPU course embedded in an FPGA fabric.

The device(s) 106 can also include one or more network interface(s) 118 to enable communications between the device(s) 106 and other networked devices, such as client computing device(s) 120 or other device(s) 106. Such network interface(s) 118 can include one or more network interface controllers (NICs) or other types of transceiver devices to send and receive communications over a network. For simplicity, other components are omitted from the illustrated device 106.

The client computing device(s) 120 are involved in the personalized image search suggestion systems described herein. The client computing device(s) 120 are illustrated as a plurality of devices 120(1)-120(N). The device(s) 120 can belong to a variety of categories or classes of devices, which can be the same as or different from the devices 106, such as traditional client-type devices, desktop computer-type devices, mobile-type devices, special purpose-type devices, embedded-type devices, and/or wearable-type devices. Thus, although illustrated as mobile computing devices, which may have less computing resources than device(s) 106, the client computing device(s) 120 can include a diverse variety of device types and are not limited to any particular type of device. The client computing device(s) 120 can include, but are not limited to, computer navigation type client computing devices 120(1) such as satellite-based navigation systems including global positioning system (GPS) devices and other satellite-based navigation system devices, telecommunication devices such as mobile phones 120(2), tablet computers 120(3), mobile phone/tablet hybrid devices, personal data assistants (PDAs) 120(4), laptop computers 120(5), other mobile computers, wearable computers, implanted computing devices, desktop computers, personal (e.g., desktop) computers 120(N), automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input. Generally, each of the devices 120 may be any device that provides browsing functionality, for example, to communicate with the search engine operating on or in connection with distributed computing resource(s) 102.

Two users 122A, 122B are also illustrated, each being associated with a plurality of the client computing devices 120. In other implementations, a user 122 may be associated only with one of the devices 120, or multiple devices 120 associated with a single user 122 may store different information. For example, in the context of this disclosure, a user 122 may have a different browsing or search history on each of multiple devices 120, or one or more of the multiple devices may be associated such that the user's browsing or search history on one of the devices 120 is attributed to the one or more other devices 120, as well. In some implementations, the user 122 could also or alternatively include one or more designees of the user such as an assistant of the user, a supervisor of the user, a spouse of the user, a parent of the user, and/or another entity to whom the user grants permission to access the particular user's client device(s) 120.

The client computing device(s) 120 of the various categories or classes and device types such as the illustrated mobile phone 120(2) and tablet computer 120(3) can represent any type of computing device having one or more processing unit(s) 124 operably connected to computer-readable media 126 such as via a bus 128, which in some instances may include one or more of a system bus, a data bus, an address bus, a PCI bus, a Mini-PCI bus, and any variety of local, peripheral, and/or independent buses.

Executable instructions stored on computer-readable media 126 can include, for example, an operating system 130 and/or modules, programs, or applications that are loadable and executable by processing units(s) 124. Alternatively, or in addition, the functionally described herein can be performed, at least in part, by one or more hardware logic components such as accelerators. For example, and without limitation, illustrative types of hardware logic components that can be used include FPGAs, ASICs, ASSPs, SOCs, CPLDs, etc. For example, an accelerator can represent a hybrid device, such as one from ZYLEX or ALTERA that includes a CPU course embedded in an FPGA fabric.

Each of the client computing devices 120 also includes a browser 132 enabling communication with the distributed computing resource(s) 102, such as with a search engine operation on the distributed computing resource(s) 102. For example, the browser 132 may facilitate submission of a search query. The browser 132 may be any suitable type of web browser, including but not limited to, Internet Explorer®, Firefox®, Chrome®, Safari® or other type(s) of software that enable submission of a query for a visual search.

The client computing devices 120 can also include one or more network interfaces 134 to enable communications between the respective client computing device(s) 120 and other networked devices, such as other of the client computing device(s) 120 (for example, to share and/or associate information among multiple devices 120 owned by a single user 122) or the devices 106, over the network(s) 104. Such network interface(s) 134 can include one or more network interface controllers (NICs) or other types of transceiver devices to send and receive communications over a network. In one example, the client computing device(s) 120 may receive information about personalized trending image search queries, including information about representative images for display to the user, from the personalized trending image search suggestion framework.

Figure 2:
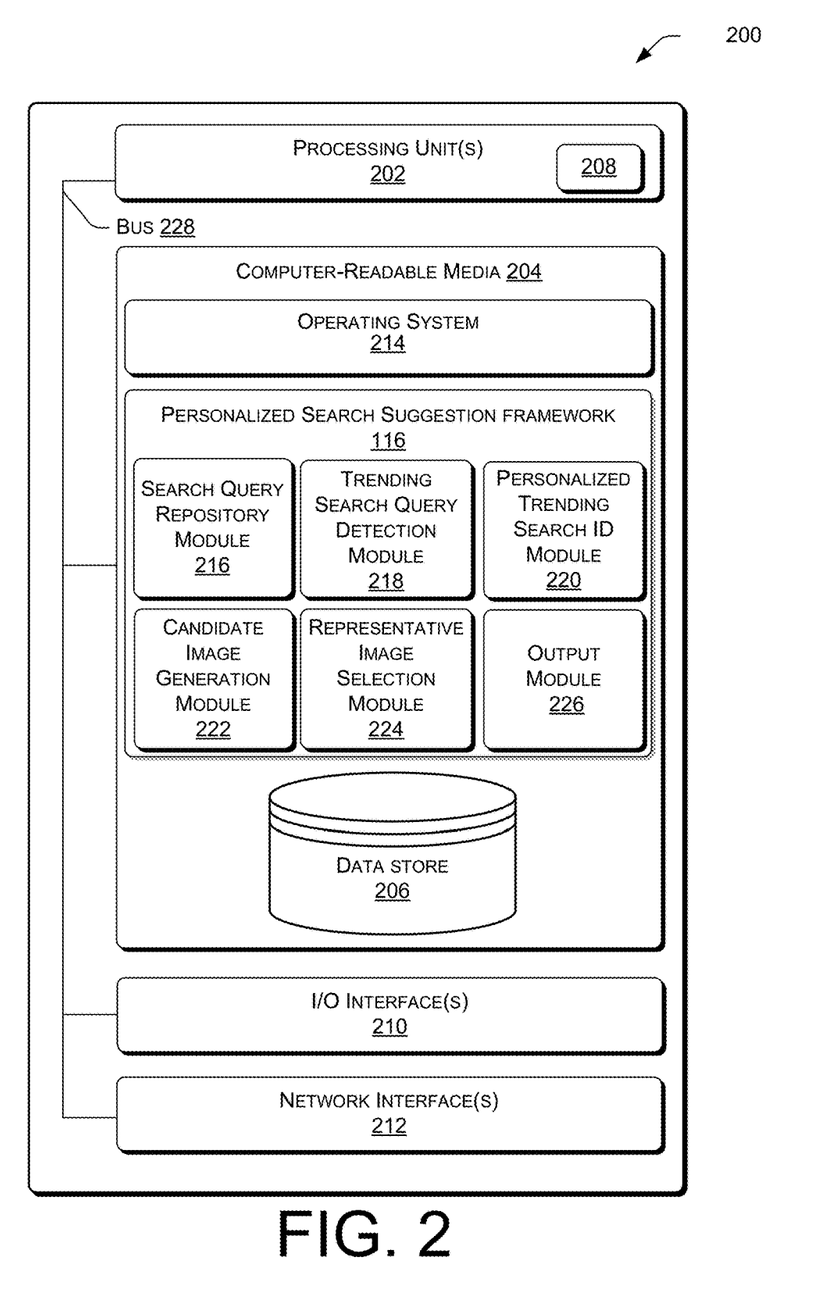
FIG. 2 is a block diagram depicting an example computing device of a distributed computing resource.

FIG. 2 is a block diagram depicting an example computing device 200 of a distributed computing resource, such as a device 106 from FIG. 1. In the device(s) 200, one or more processing unit(s) 202, which can be the processing unit(s) 108 of FIG. 1 can represent, for example, a CPU-type processing unit, a GPU-type processing unit, an FPGA, another class of digital signal processor (DSP), or other hardware logic components that may, in some instances, be driven by a CPU. For example, and without limitation, illustrative types of hardware logic components that can be used include ASICs, ASSPs, SOCs, CPLDs, etc.

In some examples, computer-readable media 204, which may be the computer-readable media 110 of FIG. 1 can store instructions executable by the processing unit(s) 202, which as discussed above, can represent a processing unit incorporated in device 200. The computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in the device 200, while in some examples one or more of a CPU, GPU, and/or accelerator is external to the device 200.

In the illustrated example, the computer-readable media 204 also includes a data store 206. In some examples, the data store 206 includes data storage such as a database, data warehouse, or other type of structured or unstructured data storage. In some examples, the data store 206 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. The data store 206 may store data for the operations of processes, applications, components, and/or modules stored in computer-readable media 204 and/or executed by processing unit(s) and/or accelerator(s) 202. The data store may store search-related data, such as a query log, click-through information, search results, and the like. Such search-related data may be associated with a search engine or it could relate to other searches, including but not limited to local searches or searches on a network. Some or all of the above-referenced data may be stored on separate memories 208 on board one or more processing unit(s) 202 such as a memory on board a CPU-type processor, a GPU-type processor, an FPGA-type accelerator, a DSP-type accelerator, and/or another accelerator.

The device 200 may further include one or more input/output (I/O) interfaces 210 to allow the device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in the device 200, one or more network interface(s) 212, which can be network interface(s) 118 shown in FIG. 1, can represent, for example, network interface controllers (NICs) or other types of transceiver devices to send and receive communications over a network.

In the illustrated example, the computer-readable media 204 includes an operating system 214, which can be the operating system 114 of FIG. 1. The computer-readable media 204 also includes the personalized trending image search suggestion framework 116. The framework 116 can include one or more modules and/or APIs, which are illustrated as blocks 216, 218, 220, 222, 224, and 226, although this is just an example, and the number can vary higher or lower. Functionality described associated with blocks 216, 218, 220, 222, 224, and 226 can be combined to be performed by a fewer number of modules and/or APIs or it can be split and performed by a larger number of modules and/or APIs.

In the illustration, block 216 generally represents an image search query repository module with logic to program the processing unit 202 to extract one or more image search queries, which may be queries from a query log. The query log may be stored, for example, in the data store 206 or in an external data store. In some examples, the image search query repository module 216 further includes logic to distinguish between search queries associated with various client devices 120 and/or various users, for example, users 122A and 122B. For example, the image search query repository module may read a tag, header, device identifier (ID), or other information associated with a search query that identifies the devices 120 or users 122 that made the quer(ies).

Block 218 generally represents a trending image search query detection module with logic to program the processing unit(s) 202 to detect image search queries that are trending. In at least one embodiment, the trending image search query detection module considers statistics about image searches in an image search query log and identifies a predetermined number of image search queries having a high frequency. These image queries may be considered trending image search queries. However, in other implementations, the trending image search query detection module 218 may compute a score (such as a "BuzzScore," described in more detail below) for each of the image search queries identified as having a high frequency. The search queries can be ranked based on their score. From the ranking of queries, trending image search queries can be identified, for example, as the queries having the top scores or the queries having a score above a threshold score.

Block 220 represents a personalized trending search identification module with logic to program the processing unit(s) 202 for identifying one or more of the trending image search queries as trending image search queries personalized for an identified user, or personalized trending image search queries. In at least one implementation, the module 220 ascertains search log data for the identified user, such as through access to the local data store 206 or a remote data store, and compares the user-specific search log data to the trending image search queries. When a trending image search query is closely related to a previous user search, for example, the module 220 may identify that trending image search query as a personalized trending image search query for the identified user.

In some examples, personalized trending image search queries may be identified using information from the search log about search queries from other users in addition to information about the identified user. For example, the module 220 may leverage information about search queries from other users to identify users who had search queries similar to those of the identified user. Other search queries of that other user may then form the basis for identifying personalized trending image search queries.

Block 222 represents a candidate image generation module with logic to program the processing unit 202 for generating candidate images representative of the trending image search queries. More specifically, the module 222 may identify a plurality of candidate images for each of the personalized trending image search queries. For example, if the name of a certain baseball player is identified as a personalized trending image search query, images of that baseball player can be identified as candidate images.

Block 224 generally shows a representative image selection module with logic to program the processing unit 202 to select a subset, e.g., one, of the candidate images as a representative image for presentation to the identified user on the user's client device 120. The representative image may be chosen based on a number of attributes of the respective candidate images. For example, the representative image may be chosen based on its relevance to the search query, which may be measured as the number of times users have clicked on the image, and/or based on its visual consistency. In at least one embodiment, the selection is further based on a burstiness of the image. Generally, burstiness describes a trendiness of the image and may take into account acceleration or increase in click-through of the image. A method for calculating burstiness is described in more detail below. In some examples, the module 224 may include a candidate image scoring module with logic to program the processing unit 202 to generate a score for each of the images, which score may a combined score derived from one or more of the images' relevance, visual consistency, burstiness, and/or other features. The representative image can be chosen to best facilitate the user's understanding of the reasons for the trending search. That is, the representative image may be chosen for its ability to convey the event underlying the image search query.

Block 226 represents an output module with logic to program the processing unit(s) 202 of the device 200 to cause presentation of the representative image(s) to the input/output interface 210 and/or the network interface 212.

Bus 228, which can be bus 112 and which in some instances can include one or more of a system bus, a data bus, an address bus, a PCI bus, a Mini-PCI bus, and any variety of local, peripheral, and/or independent buses, can operably connect the computer-readable media 204 to the processing unit(s) 202.

Figure 3:
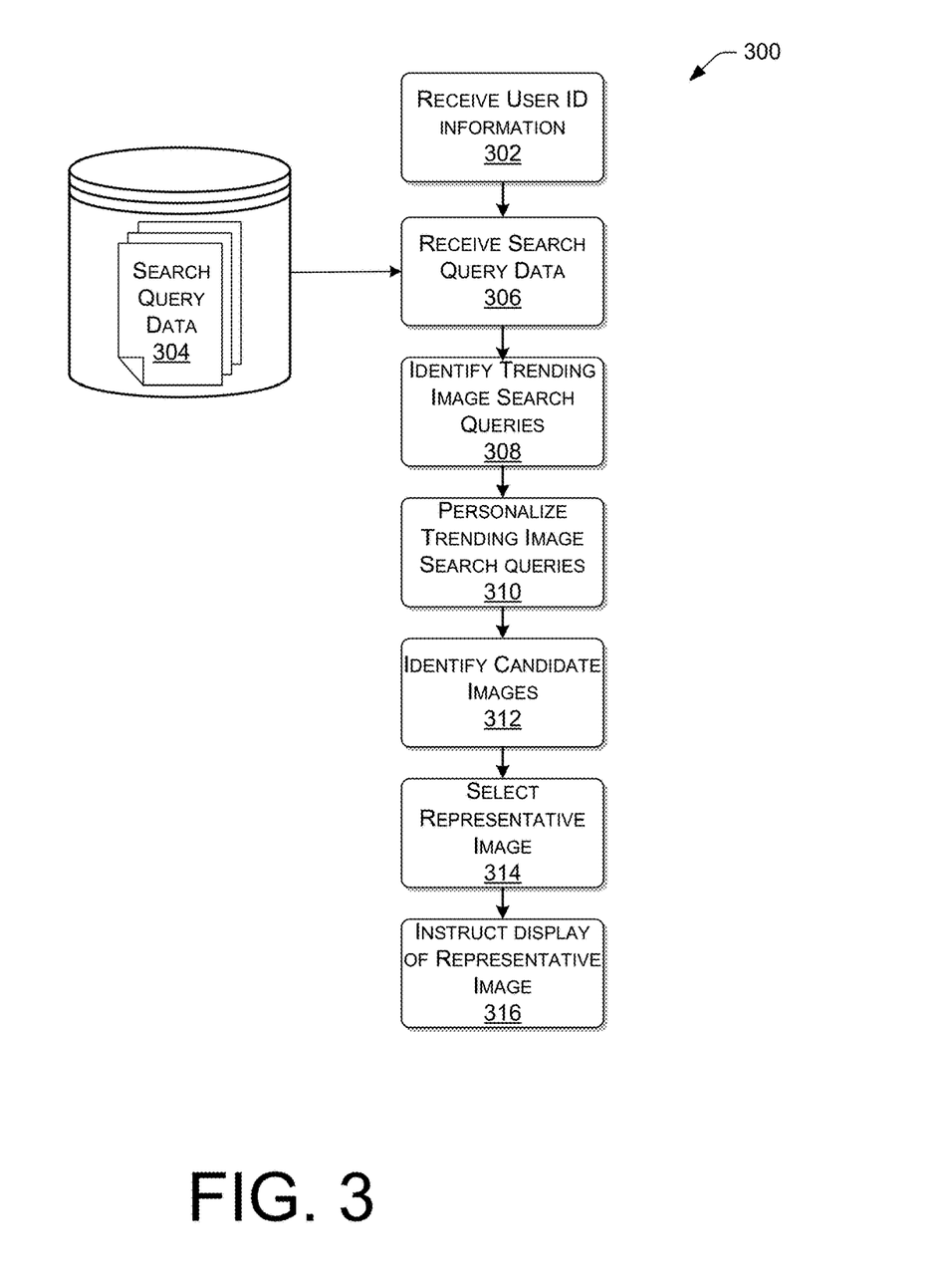
FIG. 3 is a block diagram depicting an example process architecture that can perform personalized trending image search suggestion.

FIG. 3 is a block diagram depicting an example architecture 300 of processes that the personalized trending image search query framework 216 can perform to facilitate image search query suggestion. Various portions of the architecture 300 may be done via offline processing and/or via query-time processing. In some examples the personalized trending image search suggestion framework 116 will perform all processing, whether offline or query-time. In other implementations, some or all of the architecture 300 could be performed at the device(s) 120.

The architecture 300 includes receiving user identification information at 302. The user identification information includes any information that uniquely identifies either the user 122 or the device 120 used by the user 122 to access the distributed computing resource(s) via the browser 132. For example, each of the device(s) 120 may have a unique identification, which is ascertained when the device uses the browser 132. The user identification information may constitute a device 120 identification, for example. In some implementations, the user identification information may constitute information about an identity of the user 122. For example, a user using the device(s) 120 may login to the browser or otherwise provide identifying information, which may be used by the distributed computing resource(s) 102. For purposes of the personalized trending image search suggestion framework 116, as will be described in more detail below, the user identification information associates the identified user with search queries. As used herein, "identified user" may refer to either the user or the device 120.

The architecture 300 includes operations on historical image search query data 304, which may be stored in the data store 206 or somewhere else. In experiments, search query data 304 included a large-scale search log (having 21 million users and 41 million queries in two weeks) from a commercial image search engine. The search query data 304 generally includes at least user search queries, an identification of the user making the query, and results associated with the user search queries. In some implementations, the search query data 304 also includes click-through information associated with the search queries.

At block 306, the architecture 300 receives the image search query data 304, and at 308 the architecture 300 can identify trending image search queries. Image search queries are generally identified as trending because of a recent increase in their frequency. In at least one implementation, the identification of trending image search queries may include merely identifying a predetermined number of the most frequent searches over a certain period of time. In some implementations, a certain number of the most frequent searches is determined and a metric, herein referred to in some instances as a "BuzzScore," is computed for each of those most frequent searches. Then, those frequent searches with the highest BuzzScore are identified as trending image search queries. In experiments, the 10,000 most frequent searches were identified and a BuzzScore was determined for each of those 10,000 searches. Also in those experiments, those search queries having the 100 highest BuzzScores were identified as trending image search queries.

In some implementations, the BuzzScore may be calculated using Equation (1):

$$BuzzScore(q_j) = \sum_{s=d-1}^{d-n} \frac{1}{d-s}(P(q_j | Q_d) - P(q_j | Q_s)) \quad (1)$$

where $P(q_j|Q_d)$ is the likelihood of query $Q_d$ in a given query set $Q_d$ of day d. Eqn. (1) adopts a weighted sum to aggregate all the differences in information within several days. In this manner, the identifying the trending image search queries at 308 can detect searches with dramatically rising popularity at a moment in time, e.g., at that instant. In some implementations, a maximum difference, i.e., $\max\{P(q_j|Q_d)-P(q_j|Q_s)\}$ could be used, although such an approach may not distinguish those searches queries that have attained their popularity more recently in the time frame under consideration over queries which had a spike in popularity earlier in the time frame. In experiments, the weighted sum approach performed better than the maximum difference approach.

To identify trending image search queries at 308, the architecture 300 may also select representative searches on behalf of a group of queries with similar semantics. For example, the calculation of BuzzScores at block 306 may further adopt a generalized count concept. In the generalized count concept, a first query $q_{j1}$ gives a generalized count for a second query $q_{j2}$ if $q_{j2}$ is a substring of $q_{j1}$. So, for example, a search for "President Barack Obama" provides a generalized count for the search query "Barack Obama." The BuzzScore calculated in Equation (1) may thus be modified as shown in Equation (2):

$$BuzzScore'(q_j) = BuzzScore \times \log(1 + v(q_j, d) + v^*(q_j, d)) \quad (2)$$

where $v(q_j, d)$ is the count of query $q_j$ during day d and $v^*(q_j, d)$ is the generalized count of query $q_j$ during day d. Trending image search queries may be identified as a number of queries having the highest BuzzScore', or those queries with a BuzzScore' above a threshold score.

The architecture 300 further includes personalizing the trending image search queries 310. Put simply, 310 represents a determination of which of the trending image searches determined at 308 are of most interest to the identified user. The architecture 300 may receive information about the user in 302, and determine a relationship between that information and the trending image searches queries. For example, it may be learned from the user information that the user is interested in "ballet" and "US Politics," and 310 will determine the trending image search queries that relate to these topics.

In some implementations, 310 will use information from the image search query data 304 to personalize the trending image search queries. Such information from the image search query data 304 may include a search history of the identified user. However, the search log data for each individual user is often sparse, and thus may provide very limited information about the user. Accordingly, the architecture 300 may leverage search history information about users other than the identified user. More specifically, step 310 may identify search queries the same as or similar to queries made by the identified user. Other searches made by those users may then be used as a starting point for identifying other topics that may be of interest to the identified user. Click-through data associated with those other searches may suggest which queries were of particular interest to the users, whereas those queries which were not clicked on could be of no interest, although interest in those searches is not known definitively. Thus, the click-through information essentially provides only positive data (i.e., only the queries clicked-on), which is similar to a one-class collaborative filtering (OCCF) problem. The OCCF problem has been solved in some instances using matrix factorization. In experiments using the techniques described herein, matrix factorization may also be used, inasmuch as the suggestion targets are trending searches, which by their nature are issued by many users during a short period of time. There is no sparsity issue. In at least one embodiment, a weight-regularized matrix factorization may be formulated as shown in Equation (3):

$$J(U,Q^t)=\Sigma_{i,j}W_{i,j}(R_{i,j}-u_i^T q_j^t)^2+\lambda(\|U\|_F^2+\|Q^t\|_F^2) \quad (3)$$

where R is a click through matrix, $R_{i,j}=1$ indicates user $u_i$ has issued query $q_j$ in the training set, and $(u_i, q_j)$ is called a positive pair. $R_{i,j}=0$ indicates user $u_i$ has not issued query $q_j$ in the training set, and $(u_i, q_j)$ is called a negative pair. $\lambda$ is decided by cross-validation, and in experiments was set as 0.01. $U=[u_1 \ldots u_i \ldots u_{\|U\|}]$ is a user matrix where $u_i$ is the interest of user $u_i$ as a z vector. z is the number of latent topics. $Q^t=[q_1^t \ldots q_j^t \ldots q_{\|Q^t\|}]$ is the trending search matrix wherein $q_j^t$ is the latent attributes of trending search $q_j^t$ and is a z×1 vector. $Q^t$ is the trending search set, and W is the weight matrix that controls the importance of positive pairs, defined by Equation (4):

$$W_{ij} = \begin{cases} 1 & R_{ij} = 1 \\ W_{ij}^n & R_{ij} = 0 \end{cases} \quad (4)$$

where $W_{ij}^n$ should be smaller than 1 because positive $(u_i, q_j^t)$ pairs are more significant to avoid the imbalance issue.

In this example, only trending searches are used as the target matrix. Because the number of trending searches is extremely small compared to the number of users, the results may suffer. In some instances, understanding the latent relationship between the user and the trending searches by considering all search queries (i.e., trending and non-trending search queries) may lead to better results. For example, $q_j^t$, $Q^t$, and $Q^t$ can be replaced by $q_j$, Q, and Q, respectively, wherein $Q=Q^t \cup Q^c$ when $Q^c$ is the common search set, and $q_j^c$ represents a common search query. Using the common search set, however, neglects the importance of trending searches, which are the suggestion target. Specifically, treating each common search as equal to each trending search may sacrifice the accuracy of trending searches because of the far greater number of common searches compared to trending searches.

Aspects of the present disclosure leverage information about common searches without sacrificing the accuracy of trending searches using a "trending aware" weighted regularized matrix factorization technique (TA-WRMF). This technique accounts for the quantitative imbalance between positive and negative pairs as well as the quantitative imbalance between trending and common searches. Specifically, the TA-WRMF technique may define the weighted matrix W as Equation (5):

$$W_{ij} = \begin{cases} 1 \times W_P & R_{ij} = 1 \wedge q_j \in Q^t \\ 1 & R_{ij} = 1 \wedge q_j \in Q^c \\ W_N & R_{ij} = 0 \wedge q_j \in Q^t \\ W_N \times W_{ij}^n & R_{ij} = 0 \wedge q_j \in Q^c \end{cases} \quad (5)$$

where $W_P>1$ increases the importance of positive pairs and $W_N<1$ controls the importance of negative pairs. $W_{ij}^n$ is only applied on negative pairs. Under this construct, the pairs containing $q_j^t$ are more important/positive pairs.

As may be appreciated from the foregoing, applying the TA-WRMF technique to all search queries is a large task, and the time to perform same may be unacceptable. Accordingly, in some examples, the complexity may be reduced by adopting a user-oriented sampling strategy to approximate. Specifically, the number of negative sampled pairs $N_i^{ns}$ is proportional to the number of positive pairs $N_i^p$ of a user $u_i$. Where m is the ratio of negative sample pairs to positive sample pairs ($N_i^{ns}/N_i^p$), as shown in Equation (6):

$$W_{ij}^n \approx \frac{N_i^{ns}}{N_i^p} \quad (6)$$

$$= \frac{m \times N_i^p}{N_i^p}$$

in which $N_i^n$ is the number of negative pairs of $u_i$. The complexity is now greatly reduced, and Equation (3) may be solved using stochastic gradient descent for improved efficiency. In this example, the iteration formulas are shown as Equations (7) and (8):

$$u_i=u_i+\alpha(-W_{ij}(R_{id}-u_i^T q_j)q_j+\lambda u_i), \quad (7)$$

$$q_j=q_j+\alpha(-W_{ij}(R_{id}-u_i^T q_j)q_j+\lambda q_j), \quad (8)$$

where $\alpha$ is the learning rate and $\lambda$ is the regularization term. In a training phase, part of $(u_i, q_j)$ pairs are separated from training data to form a validation set, with convergence claimed when Equation. (3) does not decrease for c continuous iterations on the validation set. The following algorithm summarizes the optimization process.

TABLE 1

Input: A list of positive ($R_{ij}$ = 1) (user, search) pairs L including both trending and non-trending searches.
Output: U, Q
1:  Initialize U, Q by uniform sampling from (−1, 1)
2:  Append all negative (user, trending search) pairs to L
3:  repeat
4:    for all ($u_i$, $q_j$) in L do
5:      if $R_{ij}$ == 1 then
6:        Randomly sample m pairs of ($u_i$, $q_x$), where ($u_i$, $q_x$) is not part of L
7:        Update m pairs of ($u_i$, $q_x$) by Eqn. (7)
8:      end if
9:      Update $u_i$, $q_j$ by Eqn. (7)
10:   end for
11: until Converge.

The TA-WRMF functionality just described is one method for determining personalizing trending image search queries 310. The personalized trending image search queries may then be presented to the identified user. More specifically, an image is presented to the user for each personalized trending image search query. In some implementations, a textual description of the query may also be presented with the image. Selecting, e.g., clicking on, the image and/or accompanying text will execute the search query for the user.

At 312, the architecture 300 can identify one or more images corresponding to each of the personalized trending image search queries. At 314, one of those images is selected as a representative image, e.g., for presentation to the user as representative of the trending image search query, and at 316 display of the representative image is instructed.

In some embodiments, the candidate images may be all images returned by the search engine in response to the query, may be images mined from one or more social image collections, or may come from some other image source. The representative image may be chosen based on some criteria, which criteria may relate to the search query, e.g., a number of clicks or most recently clicked, to the image itself, e.g., upload date, source of the image or visual properties of the image, to user interactions with the image, e.g., number of likes or number of shares, or some other criteria or combination of criteria.

In some embodiments, the representative image is selected for its ability to facilitate the user's understanding of the reason for the trending nature of the personalized trending image search query. That is, the representative image may be chosen because it best tells the story of why the query it represents is trending. Although any number of criteria may be used to choose the representative image, in an example implementation, the representative image 314 is selected from all candidate images based on a relevancy of the image, a freshness of the image, the visual consistency of the image, and click-through information about the image. The click-through information may include a click count, an increase in click-through frequency (herein, a burst rate or "burstiness" of the image), or something else.

As used herein, relevance is assumed to relate to click count ($c_{k,j}$) of an image ($I_k \in I$) associated with the trending search ($q_j^t$). Under this construct, the higher the $c_{k,j}$, the more relevant $I_k$. Thus, the relevance $P_c(I_k, q_j^t)$ is decided by the likelihood of $I_k$ given $q_j^t$, according to Equation (9):

$$P_c(I_k, q_j^t) = \frac{c_{ij}}{\sum_l c_{lj}} \qquad (9)$$

The visual consistency of an image may be determined by assuming that an image with more similar neighbors has a higher chance of being selected. Implementations may apply the Bag-of-Visual-Word model on the Scale Invariant Feature Transform features to measure the similarity sim(k,l) of any pair of images ($I_k$, $I_l$). A random walk process may then be adopted to derive the visual consistency. For each trending search $q_j^t$, every image $I_k \in I$ such that $c_{i,j}>0$ is a node $n_k$ and forms an image set $I_j^t$. $n_k$ has a directed edge $e_{k,l}$ to $n_l$ if $l_l$ is a K-Nearest Neighbor (K-NN, K=5) of $I_k$. The edge weight $e_{k,l}$ is defined as $$\frac{sim(k, l)}{\sum_{l_s \in KNN(l_s)} sim(k, s)}.$$

Accordingly, the visual consistency $P_v(I_k, q_j^t)$ of $I_k$ can be formulated according to Equation (10):

$$P_v(I_k, q_j^t) = \left(\alpha E + \frac{(1-\alpha)}{|I_j^t|} 1^T\right) P_v(I_k, q_j^t) \qquad (10)$$

wherein E is transition matrix consisting of $e_{i,j}$ and 1 is the vector ones. As will be appreciated, the optimal $P_v(I_k, q_j^t)$ is the eigenvector with largest eigenvalue.

In determining the burstiness of the image, the image with an abruptly large amount of increasing click-through is assumed to better describe the search query. In this implementation, the burstiness $P_b(I_k, q_j^t)$ of the image $I_k \in I$ for each trending search $q_j^t$ is formulated according to Equation (11):

$$P_b(I_k, q_j^t) = \sum_{s=d-1}^{d-n} \frac{1}{d-s}(P(I_k \mid q_j^t, d) - P(I_k \mid q_j^t, s)), \qquad (11)$$

where $P(I_k|q_j^t, d)$ is the probability of image $I_k$ being clicked given trending search $q_j^t$ at day d.

The freshness of the image may also be considered. Specifically, older images are very rarely the best representation of a current event. Most often, a trending image associated with a trending search will be uploaded recently, i.e., near the time of the trend. Freshness may be determined according to Equation (12):

$$P_f(I_k|q_j^t,d)=d-T(I_k) \qquad (12)$$

where the trending query is detected at day d, and the image $I_k$ associated with the trending query q is fetched by image search engine at time $T(I_k)$.

In some implementations, each of $P_c(I_k,I_j^t)$, $P_v(I_k,q_j^t)$, $P_b(I_k,q_j^t)$, and $P_f(I_k|q_j^t,d)$ may be determined, and a composite score or ranking is computed for each image in the set I. In at least one implementation, the image with the highest composite score or ranking is the representative image. In some implementations, a different image may selected as the representative image. For example, the highest-ranking image may not be available, e.g., because it is rights-restricted. Those have ordinary skill in the art with the benefit of this disclosure will appreciate other scenarios and modifications.

At 316, the architecture 300 instructs display of the representative image on the client device 120. In one implementation, a plurality of personalized trending image search queries are identified, a representative image for each is determined, and those representative images are displayed in an array to the user upon opening the web browser. A textual description of the query may also be displayed with the image. Because a goal of the architecture is to suggest image queries, display of the images may be done in the absence of a contemporaneous search query by the user. In some implementations, the user need only access the browser to be presented with the personalized trending image search queries. In other implementations, the user may be prompted to select a link or other feature to instruct presentation of the representative images.

In example experiments image search logs were collected for two weeks and each entry in the log included five elements, namely, user, query, URL, time, and nationality. The dataset contained 21 million unique users, 41 million unique queries, and 61 million unique URLs. Only the search logs in the US were used and controls were used to reduce the number spam users aiming to promote specific searches. (Specifically, any users who issued more than 50 search queries in a single session were tagged as spam users and their query logs were removed from consideration.) Similarly, any queries with a frequency below a certain threshold (3 in some experiments) were removed. After this removal of spammers and low-frequency searches, there were 15 million unique users, 9 million unique queries, and 61 million unique URLs in the final dataset.

Figure 4:
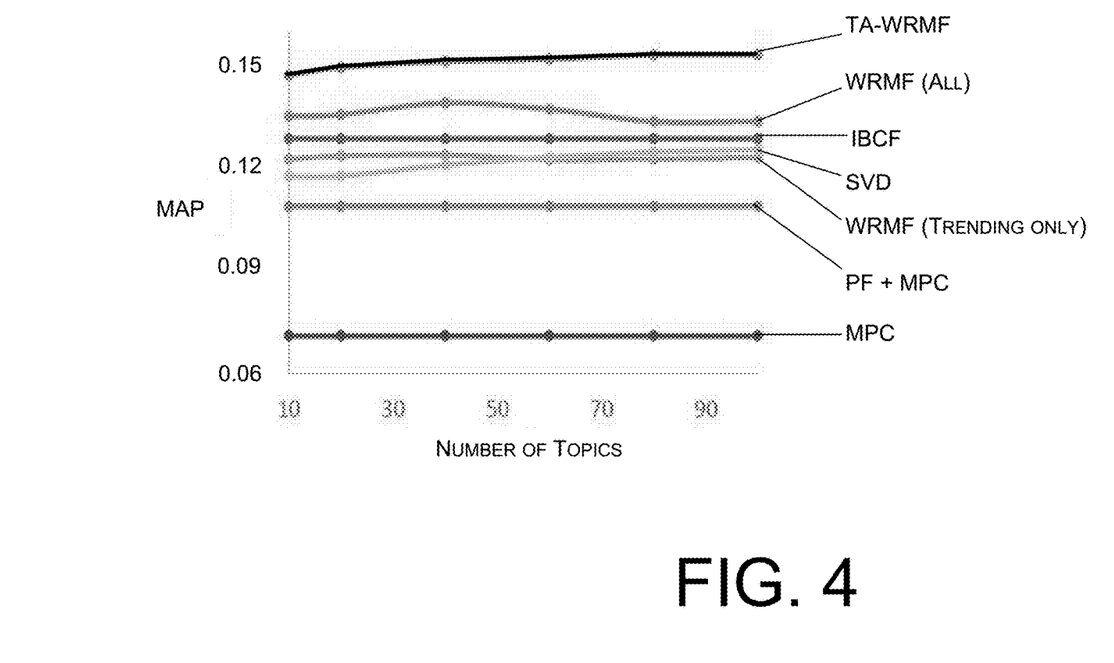
FIG. 4 is a graph illustrating the effectiveness of techniques described herein when compared against other methods.

In the experiment, Equations (1) and (2) were used (with s=3) to determine the trending searches. For evaluation, the top 100 trending queries were identified as trending image search queries. The TA-WRMF model was then applied to the trending queries to determine the personalized trending image search queries. The TA-WRMF model described above was considered along with five baselines: a most popular candidates (MPC) model, a personal frequency (PF) plus MPC model, an item-based collaborative filtering (IBCF) approach, a singular vector decomposition (SVD) model, and a weighted regularized matrix factorization (WRMF) approach. For further analysis, the WRMF approach was run on two datasets, namely, all queries and only trending queries. To determine the efficacy of the personalization of the trending searches, a mean-average-precision (MAP) was adopted as the metric. FIG. 4 illustrates the comparison of the various techniques. As shown, the TA-WRMF model provided better results than each of the five baselines.

Example Clauses

A: A method comprising: identifying trending image search queries from a plurality of user image search queries identifying a subset of the trending image search queries as personalized trending image search queries, wherein the personalized trending image search queries are personalized for an identified user of the plurality of users and are identified based at least in part on a relationship between the identified user and the trending image search queries; determining, for individual of the personalized trending image search queries, one or more candidate images representative of respective of the personalized trending image search queries; and identifying, for individual of the personalized trending image search queries, at least one representative image from the candidate images representative of the respective of the personalized trending image search queries.

B: A method as paragraph A recites, wherein the plurality of user image search queries is made by a plurality of users and/or wherein the identifying the trending image search queries comprises determining a score for a plurality of image search queries and the identifying the trending image search queries being based at least on the score.

C: A method as either paragraph A or B recites, further comprising determining the relationship between the identified user and the trending image search queries based at least in part on the trending image search queries, the plurality of user image search queries other than the trending image search queries, and click-through information associated with responses to the user image search queries.

D: A method as any one of paragraphs A-C recites, wherein the determining the relationship between the identified user and the trending image search queries comprises comparing search log data of the identified user to search log data of a plurality of second users.

E: A method as any one of paragraphs A-D recites, wherein the plurality of user image search queries includes user image search queries from users other than the identified user.

F: A method as any one of paragraphs A-E recites, further comprising instructing display of the representative image to the identified user on a device associated with the identified user.

G: A method as any one of paragraphs A-F recites, wherein the instructing display of the representative image to the identified user is performed in the absence of a contemporaneous search by the identified user.

H: A method as any one of paragraphs A-G recites, wherein the identifying the representative image from the candidate images comprises scoring each of the candidate images and selecting the representative image based on the score.

I: A method as any one of paragraphs A-G recites, wherein the scoring is based on at least one of a relevance of the candidate images, a visual consistency of the candidate images, a freshness of the candidate images, or a burstiness of the candidate images.

J: A method as any one of paragraphs A-I recites, wherein the scoring is based at least in part on the burstiness of the one or more images, and the burstiness is measured as an increase in click-through of the respective image.

K: A method as any one of paragraphs A-J recites, wherein the determining the one or more representative images comprises investigating click-through data of image search queries associated with a plurality of users different from the identified user.

L: A computer readable medium having computer-executable instructions thereon, the computer-executable instructions to configure a computer to perform a method as any one of paragraphs A-K recites.

M: A device comprising: a computer-readable media having computer-executable instructions thereon to configure a computer to perform a method as any one of paragraphs A-L recites, the processing unit adapted to execute the instructions to perform the method as any one of paragraphs A-L recites.

N: A device comprising: one or more computer-readable media having thereon a plurality of modules and a query log; a processing unit operably coupled to the computer-readable media, the processing unit adapted to execute modules of the plurality of modules comprising: a personalized trending image search module configured to identify, based at least in part on a preference of the identified user, personalized trending image search queries from a plurality of image search queries in the query log; and a representative image identification module configured to identify a representative image corresponding to individual of the plurality of personalized trending image search queries identified by the personalized trending image search module.

O: The device as paragraph N recites, further comprising a candidate image generation module configured to identify one or more candidate images for each of the personalized trending image search queries.

P: The device as any of paragraphs N or O recites, wherein the representative image identification module is configured to identify the representative image from the candidate images.

Q: The device as any of paragraphs N-P recites, wherein the representative image identification module is configured to score the candidate images using click-through information associated with the respective personalized trending image search queries and/or wherein the representative image identification module is configured to score the candidate images based on an increased frequency in the number of clicks associated with the respective personalized image search queries.

R: A device as any one of paragraphs N-Q recites, further comprising an output module configured to output information about the personalized trending image search queries and the associated representative images to a device associated with the user.

S: A device as any one of paragraphs N-R recites, wherein the output module is configured to output the information about the personalized trending image search queries and the associated representative images to the device in the absence of a contemporaneous input from the identified user.

T: One or more computer readable media having thereon computer-executable instructions, the computer-executable instructions, upon execution, configuring a computer to perform operations comprising: identifying trending image search queries comprising text-based queries for visual content; identifying user preference information about a user; determining, based at least in part on the user preference information, personalized trending image search queries, wherein the personalized trending image search queries are personalized for the user; determining, for individual of the personalized trending image search queries, a plurality of candidate images corresponding to respective of the personalized trending image search queries; and identifying, based at least on information about the plurality of candidate images, at least one of the plurality of representative images as a personalized image for presentation to the user.

U: The media as paragraph T recites, wherein the information about the plurality of candidate images includes a burstiness of the image.

V: The media as paragraph T or U recites, wherein the user preference information about the user is based at least in part on a search history of the user.

W: The media as any one of paragraphs T-V recites, wherein the user preference information about the user is based at least in part on search histories of users other than the user.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 200, and/or 300 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, is understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    calculating, for each trending image search query in trending image search queries, a weighted sum of probabilities that the trending image search query is clicked within a plurality of time periods, wherein more recent time periods are weighted heavier compared to later time periods;
    identifying, using an electronic processor, the trending image search queries from a plurality of user image search queries based on the weighted sum of probabilities, the plurality of user image search queries being made by a plurality of users;
    determining a first weight for an individualized user based on a positive user-query pair included in a query history of the individualized user that indicates the individualized user clicked on a first previous query similar to a first trending image search query from the trending image search queries;
    determining a second weight for the individualized user based on a negative user-query pair included in the query history of the individualized user that indicates the individual user did not click on a second previous query similar to a second trending image search query from the trending image search queries, wherein the second weight is less than the first weight;

identifying, using the electronic processor, a subset of the trending image search queries as personalized trending image search queries using the first weight and the second weight, wherein the personalized trending image search queries are personalized for an identified user of the plurality of users and are identified based at least in part on a relationship between the identified user and the trending image search queries, wherein the relationship is identified in part based on a positive convergence between the first previous query and members of the trending image search queries proportional to a negative convergence between the second previous query and the members of the trending image search queries;

determining, using the electronic processor, for individual of the personalized trending image search queries, one or more candidate images representative of respective of the personalized trending image search queries, wherein the one or more candidate images are determined in the absence of a contemporaneous input from the identified user; and identifying, using the electronic processor, for individual of the personalized trending image search queries, at least one representative image from the candidate images representative of the respective of the personalized trending image search queries.

2. The method of claim 1, wherein the identifying the trending image search queries comprises determining a score for a plurality of image search queries and the identifying the trending image search queries being based at least on the score.

3. The method of claim 1, further comprising determining the relationship between the identified user and the trending image search queries based at least in part on the trending image search queries, the plurality of user image search queries other than the trending image search queries, and click-through information associated with responses to the user image search queries.

4. The method of claim 1, wherein the determining the relationship between the identified user and the trending image search queries comprises comparing search log data of the identified user to search log data of a plurality of second users.

5. The method of claim 1, wherein the plurality of user image search queries includes user image search queries from users other than the identified user.

6. The method of claim 1, further comprising instructing display of the representative image to the identified user on a device associated with the identified user.

7. The method of claim 6, wherein the instructing display of the representative image to the identified user is performed in the absence of a contemporaneous search by the identified user.

8. The method of claim 1, wherein the identifying the representative image from the candidate images comprises scoring individual of the candidate images and selecting the representative image based at least in part on the score.

9. The method of claim 8, wherein the scoring is based on at least one of a relevance of the candidate images, a visual consistency of the candidate images, a freshness of the candidate images, or a burstiness of the candidate images.

10. The method of claim 8, wherein the scoring is based at least in part on the burstiness of the candidate images, and the burstiness is measured as an increase in click-through of a respective image of the candidate images.

11. The method of claim 1, wherein the determining the one or more representative images comprises investigating click-through data of image search queries associated with a plurality of users different from the identified user.

12. A device comprising:
one or more computer-readable media having thereon a plurality of modules and a query log;
a processing unit operably coupled to the computer-readable media, the processing unit adapted to execute modules of the plurality of modules
comprising: a personalized trending image search module configured to:
calculate, for each trending image search query in trending image search queries, a weighted sum of probabilities that the trending image search query is clicked within a plurality of time periods, wherein more recent time periods are weighted heavier compared to later time periods;
identify the trending image search queries from a plurality of user image search queries based on the weighted sum of probabilities, the plurality of user image search queries being made by a plurality of users;
determine a first weight for an individualized user based on a positive user-query pair included in a query history of the individualized user that indicates the individualized user clicked on a first previous query similar to a first trending image search query from the trending image search queries;
determining a second weight for the individualized user based on a negative user-query pair included in the query history of the individualized user that indicates the individual user did not click on a second previous query similar to a second trending image search query from the trending image search queries, wherein the second weight is less than the first weight;
identify, based at least in part on a preference of an identified user and the first weight and the second weight, personalized trending image search queries from a plurality of image search queries in the query log, wherein the personalized trending image search queries are identified in part by a relationship between the identified user and the trending image search queries, wherein the relationship is identified in part based on a positive convergence between the first previous query and members of the trending image search queries proportional to a negative convergence between the second previous query and the members of the trending image search queries; and
a representative image identification module configured to identify a representative image corresponding to individual of the plurality of personalized trending image search queries identified by the personalized trending image search module, wherein the representative image is determined in the absence of a contemporaneous input from the identified user.

13. The device of claim 12, further comprising a candidate image generation module configured to identify one or more candidate images for each of the personalized trending image search queries.

14. The device of claim 13, wherein the representative image identification module is configured to identify the representative image from the candidate images.

15. The device of claim 13, wherein the representative image identification module is configured to score the candidate images using click-through information associated with the respective personalized trending image search queries.

16. The device of claim 12, further comprising an output module configured to output information about the personalized trending image search queries and the associated representative images to a device associated with the user.

17. The device of claim 16, wherein the output module is configured to output the information about the personalized trending image search queries and the associated representative images to the device in the absence of a contemporaneous input from the identified user.

18. One or more non-transitory computer-readable media having thereon computer-executable instructions, the computer-executable instructions, upon execution, configuring a computer to perform operations comprising:

calculating, for each trending image search query in trending image search queries, a weighted sum of probabilities that the trending image search query is clicked within a plurality of time periods, wherein more recent time periods are weighted heavier compared to later time periods;

identifying trending image search queries, based on the weighted sum of probabilities, comprising text-based queries for visual content;

identifying user preference information about a user;

determining a first weight for an individualized user based on a positive query-user pair included in a query history of the individualized user that indicates the individualized user clicked on a first previous query similar to a first trending image search query from the trending image search queries;

determining a second weight for the individualized user based on a negative user-query pair included in the query history of the individualized user that indicates the individual user did not click on a second previous query similar to a second trending image search query from the trending image search queries, wherein the second weight is less than the first weight;

determining, based at least in part on the user preference information, the first weight, and the second weight, personalized trending image search queries, wherein the personalized trending image search queries are personalized for the user, wherein the personalized trending image search queries are identified in part by a relationship between the user and the trending image search queries, wherein the relationship is identified in part based on a positive convergence between the first previous query and members of the trending image search queries proportional to a negative convergence between the second previous query and the members of the trending image search queries;

determining, for individual of the personalized trending image search queries, a plurality of candidate images corresponding to respective of the personalized trending image search queries, wherein the plurality of candidate images are determined in the absence of a contemporaneous input from the user; and identifying, based at least on information about the plurality of candidate images, at least one of the plurality of candidate images as a personalized image for presentation to the user.

19. The non-transitory computer-readable media of claim 18, wherein the information about the plurality of candidate images includes a burstiness of the image.

20. The non-transitory computer-readable media of claim 18, wherein the user preference information about the user is based at least in part on a search history of the user and search histories of users other than the user.

* * * * *